(12) United States Patent
Zhuo et al.

(10) Patent No.: US 11,449,402 B2
(45) Date of Patent: Sep. 20, 2022

(54) HANDLING OF OFFLINE STORAGE DISK

(71) Applicant: EMC IP Holding Company LLC, Hopkinton, MA (US)

(72) Inventors: Baote Zhuo, Beijing (CN); Jibing Dong, Beijing (CN); Jian Gao, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 389 days.

(21) Appl. No.: 16/835,749

(22) Filed: Mar. 31, 2020

(65) Prior Publication Data
US 2020/0341874 A1 Oct. 29, 2020

(30) Foreign Application Priority Data
Apr. 29, 2019 (CN) .......................... 201910357279.1

(51) Int. Cl.
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0659* (2013.01); *G06F 3/0689* (2013.01); *G06F 2201/82* (2013.01)

(58) Field of Classification Search
CPC .. G06F 11/2094; G06F 3/0619; G06F 3/0659; G06F 3/0689; G06F 2201/82; G06F 11/1469; G06F 11/2041; G06F 11/2053
USPC ........................................................ 714/6.22
See application file for complete search history.

(56) References Cited

U.S. PATENT DOCUMENTS

| 8,726,070 | B2 | 5/2014 | Nelogal et al. |
| 8,751,862 | B2 | 6/2014 | Cherian et al. |
| 9,542,272 | B2 | 1/2017 | Krishnamurthy et al. |
| 9,715,431 | B2 | 7/2017 | Chadwell |
| 10,013,323 | B1 | 7/2018 | Puhov et al. |
| 10,095,585 | B1 | 10/2018 | Proulx |
| 11,132,256 | B2 | 9/2021 | Roberts |
| 2014/0310489 | A1* | 10/2014 | Chambliss ............ G06F 3/0665 711/162 |

* cited by examiner

*Primary Examiner* — Yair Leibovich
(74) *Attorney, Agent, or Firm* — BainwoodHuang (57) ABSTRACT

Techniques for storage management involve: in response to a first disk becoming offline and remaining offline until a first time point, selecting a second storage slice in a second disk as a backup storage slice for a first storage slice in the first disk, the first storage slice being one of slices forming a redundant array of independent disks (RAID), the slices being located in different disks. The techniques further involve: writing, between the first time point and a second time point, data to be written into the first storage slice in the RAID to the second storage slice, the second time point being later than the first time point. The techniques further involve: in response to the first disk remaining offline until the second time point, replacing the first storage slice in the RAID with the second storage slice. Such techniques may improve performance of a RAID-based storage system.

17 Claims, 6 Drawing Sheets

HANDLING OF OFFLINE STORAGE DISK

CROSS REFERENCE TO RELATED APPLICATION

This application claims priority to Chinese Patent Application No. CN201910357279.1, on file at the China National Intellectual Property Administration (CNIPA), having a filing date of Apr. 29, 2019, and having "HANDLING OF OFFLINE STORAGE DISK" as a title, the contents and teachings of which are herein incorporated by reference in their entirety.

FIELD

Embodiments of the present disclosure generally relate to a computer system or a storage system, and more particularly, to a storage management method, an electronic device and a computer program product.

In a conventional redundant array of independent disks (RAID)-based storage system, if a storage disk (drive) or a storage slice (drive slice) in a RAID is removed or failed, the storage system will send an event notification to backend, making the backend update its storage disk information. After that, backend can send event notification to RAID module, to indicate that the storage disk or the storage slice is offline. Next, RAID module will update its storage disk information or storage slice information, wait for a predetermined duration (e.g., 5 minutes), then trigger a backup operation wherein the offline storage disk or storage slice is replaced by a backup storage disk or storage slice, and perform data rebuilding in the backup storage disk or storage slice.

However, the above mentioned backup operation and rebuild operation in the conventional RAID-based storage system have various shortcomings and deficiencies, which cannot meet the performance requirements of storage systems in many scenarios, resulting in a poor user experience.

SUMMARY

Embodiments of the present disclosure relate to a storage management method, an electronic device and a computer program product.

In the first aspect of the present disclosure, a storage management method is provided. The method includes: in response to a first storage disk becoming offline and remaining offline until a first time point, selecting a second storage slice in a second storage disk as a backup storage slice for a first storage slice in the first storage disk, the first storage slice being one of a plurality of storage slices forming a redundant array of independent disks (RAID), the plurality of storage slices being located in different storage disks. The method further includes: writing, between the first time point and a second time point, data to be written into the first storage slice in the RAID to the second storage slice, the second time point being later than the first time point. The method further comprises: in response to the first storage disk remaining offline until the second time point, replacing the first storage slice in the RAID with the second storage slice.

In the second aspect of the present disclosure, an electronic device is provided. The electronic device includes: at least one processor; and at least one memory storing computer program instructions, the at least one memory and the computer program instructions are configured, with the at least one processor, to cause the electronic device to: in response to a first storage disk becoming offline and remaining offline until a first time point, selecting a second storage slice in a second storage disk as a backup storage slice for a first storage slice in the first storage disk, the first storage slice being one of a plurality of storage slices forming a redundant array of independent disks (RAID), the plurality of storage slices being located in different storage disks. The at least one memory and the computer program instructions are further configured to, with the at least one processor, cause the electronic device to: writing, between the first time point and a second time point, data to be written into the first storage slice in the RAID to the second storage slice, the second time point being later than the first time point. The at least one memory and the computer program instructions are further configured to, with the at least one processor, cause the electronic device to: in response to the first storage disk remaining offline until the second time point, replacing the first storage slice in the RAID with the second storage slice.

In the third aspect of the present disclosure, a computer program product is provided. The computer program product is tangibly stored on a non-volatile computer-readable medium and including machine-executable instructions, the machine-executable instructions, when executed, cause the machine to perform steps of the method according to the first aspect.

It will be appreciated that the contents described in the Summary part is not intended to limit the key or important features of embodiments of the present disclosure, as well as not used to limit the scope of the present disclosure. Other features of the present disclosure will be readily appreciated by the following description.

BRIEF DESCRIPTION OF THE DRAWINGS

Through the reading of the following detailed description with reference to the accompanying drawings, the above and other objectives, features, and advantages of embodiments of the present disclosure will become more apparent. Several embodiments of the present disclosure will be illustrated by way of example but not limitation in the drawings in which.

Throughout the drawings, the same or similar reference numerals are used to refer to the same or similar components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and sprits of the present disclosure will now be described with reference to various example embodiments illustrated in the drawings. It should be appreciated that those embodiments are described merely for the purpose of better understanding and further implementing the present disclosure for those skilled in the art and not intended for limiting the scope of the present disclosure in any manner.

Figure 1:
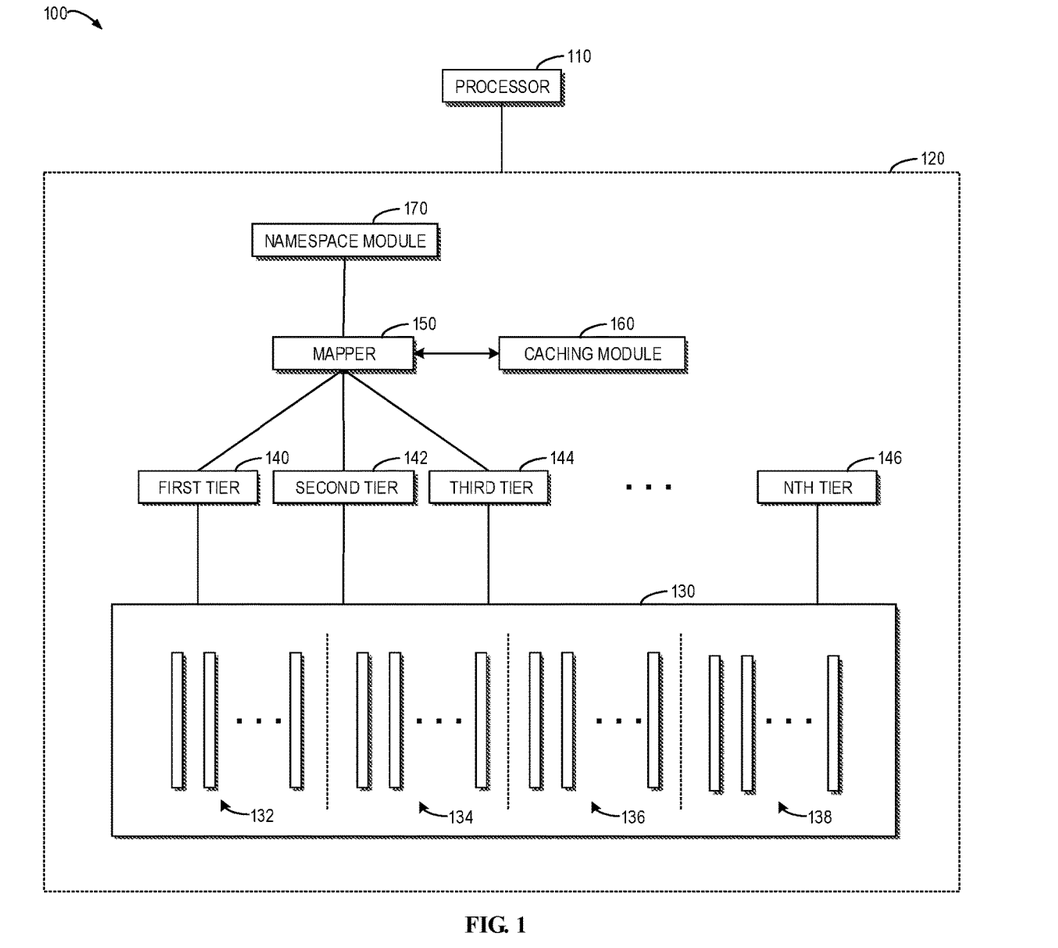
FIG. 1 is a diagram illustrating an example storage system in which embodiments of the present disclosure may be implemented.

FIG. 1 is a diagram illustrating an example storage system 100 in which embodiments of the present disclosure may be implemented. As shown in FIG. 1, the storage system 100 can include a processor 110 and a storage structure 120, wherein the processor 110 is used for performing operations related to the storage system 100, such as input/output (I/O) operations, control operations, management operations, and the like. More generally, the processor 110 can perform any operation related to the storage system 100, with cooperation with necessary hardware and software. In addition, the storage structure 120 is used to organize and manage storage resources of the storage system 100, such as various physical storage disks and the like, in an appropriate manner.

As shown in FIG. 1, the storage structure 120 includes a storage slice pool 130 that can be used to manage all of the storage disks in storage structure 120. The storage disks in the storage slice pool 130 will be organized into a plurality of RAID Recovery Sets (RRS) 132, RRS 134, RRS 136, RRS 138, and the like. Each RRS is a failure domain, meaning that if one storage disk in one RRS (e.g., RRS 132) fails, this failure will not impact the recovery of other RRSs. In a typical storage system, one RRS could include up to 25 storage disks. However, embodiments of the present disclosure are not limited to the specific numerical value described above, and in other embodiments, RRS may include any suitable number of storage disks.

In the storage slice pool 130, each storage disk can be divided into storage slices with fixed size. The size of each storage slice may be set as 4 gigabytes (GB). However, embodiments of the present disclosure are not limited to the specific numerical value described above, and in other embodiments, the size of the storage slices in the storage disk may be set as any suitable size. Therefore, the storage slice pool 130 can be considered as being constituted of sets of storage slices, and as such, it is referred to as storage slice pool.

In the storage slice pool 130, a plurality of storage slices from different storage disks may form a small RAID (compared to a large RAID constituted of a plurality of physical storage disks). The RAID may be of any suitable type. For example, if the RAID type is 4+1 RAID-5 to create one RAID group, the processor 110 can allocate 5 free storage slices from different storage disks and combine the 5 storage slices into a small RAID. In some cases, it can be required that all storage slices within one RAID come from a same RRS. In addition, each RAID may include a plurality of RAID stripes. The size of each RAID stripe may be 2 megabytes (MB), which can also be referred to as a physical large block (PLB). It will be appreciated that embodiments of the present disclosure are not limited to the specific numerical value described above, and in other embodiments, the size of the RAID stripe can be set as any suitable size.

Furthermore, as shown in FIG. 1, the storage slice pool 130 may expose or provide some tiers used by other components, including the first tier 140, the second tier 142, the third tier 144, . . . , the Nth tier 146 (N is a natural number), and so on. Each tier can be constituted of a plurality of RAID groups. For each tier, different RAID policies can be applied based on the type of the data stored thereon. Typically, all RAIDS within the same tier can have the same RAID policy, meaning the same RAID width and RAID type. Various tiers can be expanded on demands, in other words, the processor 110 may dynamically allocate a new RAID and add it to some tier.

The storage structure 120 may further include a mapper 150. The mapper 150 is a core component in the storage structure 120 that treats each tier as a flat linear physical address space. The mapper 150, on the other hand, provides a single flat linear logical address space to a namespace module 170. In some cases, this logical address space can be up to 8 exabytes (EB). As an example, the mapper 150 may use a B+ tree data structure to maintain mapping between logical addresses and physical addresses in the granularity of 4K page. It will be appreciated that embodiments of the present disclosure are not limited to specific numerical values and specific data structures described above. In other embodiments, the size of the logical address space and the granularity of the mapper may be set as any suitable value, and the mapper 150 may employ other suitable data structures to maintain mapping between logical addresses and physical addresses.

The storage structure 120 may further include a caching module 160. The caching module 160 can provide caching function within a memory (not shown). It may have two instances in the storage system 100, one of which is for user data and the other is for metadata. The caching module 160 can provide transactional operation function to the mapper 150. It will be appreciated that embodiments of the present disclosure are not limited to the specific examples described above, and in other embodiments, the caching module 160 may have any other suitable number and use of instances. In addition, the storage structure 120 may further include the namespace module 170 mentioned above. As noted above, the namespace module 170 can consume and manage the flat linear logical space provided by the mapper 150 (e.g., 8 EB in size). On the other hand, the namespace module 170 can create and provide a storage volume to a host (not shown) of the storage system 110, for use by the host.

In some embodiments, storage disks organized and managed by the storage structure 120 may include various types of devices with storage capabilities including, but not limited to, hard disk (HDDs), solid state disks (SSDs), removable disk, compact disk (CD), laser disk, optical disk, digital versatile disk (DVD), floppy disk, Blu-ray disk, serial attached small computer system interface (SCSI) storage disk (SAS), serial advanced technology attached SATA storage disk, any other magnetic storage device, and any other optical storage device, or any combination thereof.

Similarly, the processor 110 may include any device that implements control functions including, but not limited to, a special purpose computer, a general purpose computer, a general purpose processor, a microprocessor, a microcontroller, or a state machine. The processor 110 may also be implemented as an individual computing device or combination of computing devices, e.g., a combination of a DSP and a microprocessor, a plurality of microprocessors, one or more microprocessors in conjunction with a DSP core, or any other such configuration.

It should be appreciated that FIG. 1 only schematically illustrates units, modules or components in the storage system 100 that are related to embodiments of the present disclosure. In practice, the storage system 100 may further include other units, modules, or components for other functions. Thus, embodiments of the present disclosure are not limited to the specific devices, units, modules or components depicted in FIG. 1, but are generally applicable to any RAID technology based storage system.

As noted above, backup operations and rebuild operations in the conventional RAID storage system still have various shortcomings and deficiencies, which cannot meet the performance requirements of storage systems in many cases, resulting in a poor user experience. For example, a conventional RAID storage system widely employs an "incremental rebuild" method to optimize rebuild process. It means that in the case that a storage disk or a storage slice in a RAID becomes offline and restores online within short period of time (e.g. 5 minutes), the "incremental rebuild" method only rebuilds data that are newly written during a period from a storage disk or a storage slice being offline to recovering online.

Specifically, if write operations need to be performed to a degraded RAID (a RAID including an offline storage disk or storage slice) within 5 minutes from a storage disk or a storage slice becoming offline, a conventional way is to perform "degraded write" operation algorithm to the degraded RAID, that is, data are only written to remaining online storage disks or storage slices in the degraded RAID and which stripes in the degraded RAID into which data are written are recorded in metadata (e.g., Virtual Large Block, VLB).

If an offline storage disk or storage slice restores online within 5 minutes, the RAID performs an "incremental rebuild" algorithm, that is, only rebuild the stripes into which data are written after a storage disk or a storage slice being offline. As described previously, the information of which stripes are written is recorded in metadata. In contrast, if an offline storage disk or storage slice does not restore online within 5 minutes, the RAID including the offline storage disk or storage slice will perform backup operations, that is, replacing the offline storage disk or storage slice in the RAID by a backup storage disk or storage slice and performing full data rebuilding in a new storage disk or storage slice.

The above-mentioned processing method of the conventional RAID for the offline storage disk or storage slice has at least the following problems and defects. First, components such as storage systems, mappers, and RAID modules need to support the "degraded write", where data written to stripes of a degraded RAID is easily lost due to lack of redundancy protection. Second, in the incremental rebuilding process, the mapper will read all of the RAID strips, for example, in the case of 4+1 RAIDS type, RAID will read data in the other 4 online storage disks or storage slices and rebuild data in the offline storage disk or storage slice, and then restore all of the stripes to the mapper.

Next, the mapper sends an indication of "fix write" operation to RAID to cause the RAID write data stored in the degraded RAID, while the RAID only writes restoring storage disks or storage slices. Therefore, when rebuilding a RAID stripe, a mapper will perform at least 4 read operations and 1 write operation and thus, normal I/O operation of the storage system is affected because the access bandwidth of the storage disk and processing bandwidth of the processor are occupied. In addition, in the case where the offline storage disk or storage slice does not restore online, RAID needs to perform full data rebuilding, which also occupies the access bandwidth of the storage disk and the processor and thereby affecting the normal I/O operation of the storage system.

In view of the above problems and other potential problems in the conventional scheme, embodiments of the present disclosure propose a storage management method, an electronic device, and a computer program product for improving processing for storage disks or storage slices in a RAID storage system becoming offline. The basic idea of embodiments of the present disclosure is that: when a storage slice from a certain storage disk in the RAID becomes offline and continues until a first time point (for example, a few seconds), a backup storage slice in a backup storage disk is selected to temporarily store data to be written to the offline storage slice; if the offline storage disk restores online before a second time point (e.g., a few minutes), it is only required to copy the data in the backup storage slice into the offline storage slice; if the offline storage disk does not restore online before the second time point, a RAID backup process is performed in which it is only required to rebuild existing data in the offline storage slice into the backup storage slice.

Embodiments of the present disclosure may improve performance of a RAID-based storage system in both cases that a storage slice restores after being offline and a storage slice is permanently offline. For example, in the case that a storage slice restores after offline, embodiments of the present disclosure only needs to copy data in the backup storage slice into the storage slice offline but restored, that is, one read operation and one write operation. Compared to four read operations and one write operation in the conventional method (in the case of 4+1 RAIDS), this saves bandwidths of processor and storage disk and reduces impact to normal I/O performance of the storage system.

In addition, in the case that an offline storage slice is permanently offline, a backup storage slice will replace the offline storage slice in the RAID. For this purpose, it is only required to rebuild data, written into the offline storage slice before being offline, in the backup storage slice and thus, avoiding full data rebuilding in the conventional method, thereby accelerating the rebuilding process. Furthermore, embodiments of the present disclosure will not affect the implementation of other potential rebuilding optimization methods, including rebuild-based valid data perception (wherein rebuild only the area containing valid data in the offline storage slice if the storage slice is offline and does not restore), and "thin rebuild" method and so on. Some example embodiments of the present disclosure are described in detail below in conjunction with FIGS. 2-7.

Figure 2:
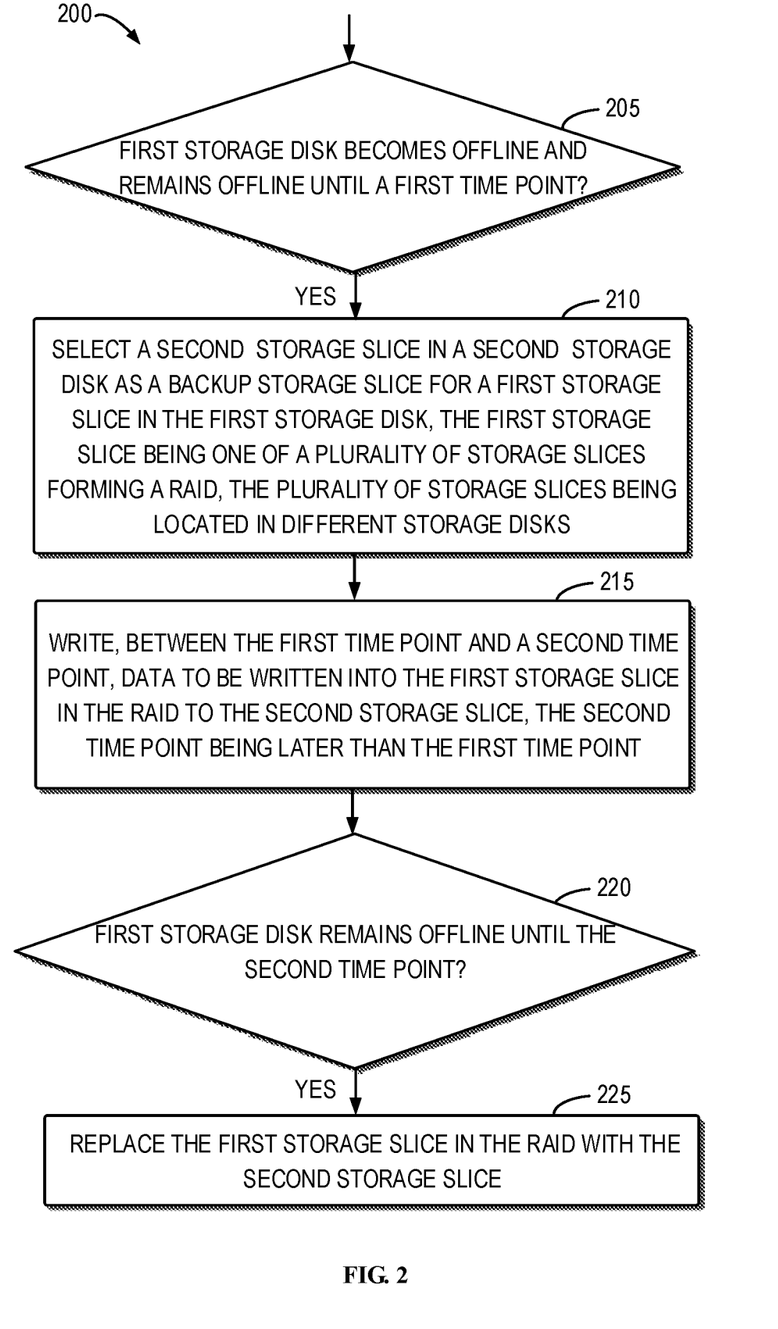
FIG. 2 is a schematic flow chart illustrating a storage management method according to an embodiment of the present disclosure.

FIG. 2 is a flow chart illustrating a storage management method 200 according to an embodiment of the present disclosure. In some embodiments, the method 200 can be implemented by a processor 110 or a processing unit of the storage system 100, or by various functional modules of the storage system 100. In other embodiments, the method 200 can also be implemented by a computing device independent from the storage system 100, or can be implemented by other units or modules in the storage system 100.

As described above with reference to FIG. 1, the storage disks in the storage system 100 can be divided into storage slices with fixed size, and the storage slices from different storage disks can form a RAID. In other words, based on the large number of storage slices provided in the storage slice pool 130, the storage system 100 can form a plurality of RAIDs. In some embodiments, the method 200 of FIG. 2 can be performed for an individual RAID constituted of a plurality of storage slices. An example scenario in which a plurality of storage slices from a plurality of different storage disks form a RAID will be described below first with reference to FIG. 3.

Figure 3:
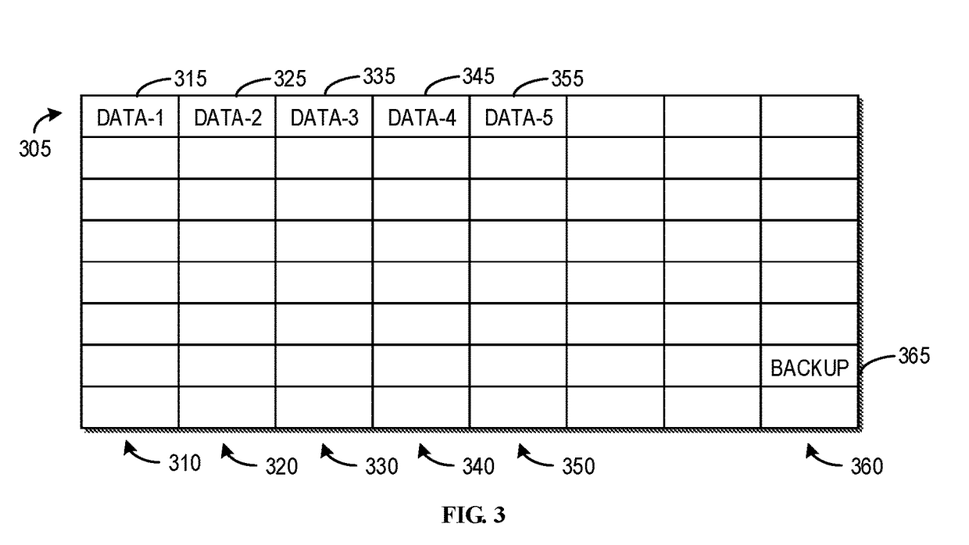
FIG. 3 is a schematic diagram illustrating that a plurality of storage slices from a plurality of storage disks form a RAID in accordance with an embodiment of the present disclosure.

FIG. 3 is a schematic diagram illustrating that a plurality of storage slices 315-355 from a plurality of storage disks 310-350 form a RAID 305 in accordance with an embodiment of the present disclosure. As shown in FIG. 3, a storage disk 310 (also referred to as a first storage disk hereinafter) is divided into a plurality of storage slices including a storage slice 315 (also referred to as a first storage slice hereinafter). Similarly, a storage disk 320 is divided into a plurality of storage slices including the storage slice 325, a storage disk 330 is divided into a plurality of storage slices including the storage slice 335, a storage disk 340 is divided into a plurality of storage slices including the storage slice 345, a storage disk 350 is divided into a plurality of storage slices including the storage slice 355, and a storage disk 360 is divided into a plurality of storage slices including the storage slice 365.

As shown, the storage slices 315, 325, 335, 345, and 355 form a 4+1 RAID 5 type RAID 305, in which the storage slice 315 stores data-1, the storage slice 325 stores data-2, the storage slice 335 stores data-3, the storage slice 345 stores data-4, and the storage slice 355 stores data-5. According to the property of RAID5, any one of data-1 to data-5 can be rebuilt from the other four data through RAID algorithms. In other words, the first storage slice 315 in the first storage disk 310 is one of a plurality of storage slices forming the RAID 305, and the plurality of storage slices forming the RAID 305 are located in different storage disks. Further, although not shown, a certain number of free storage slices may be reserved in each of the storage disks as backup storage slices, for replacement when failure occurs to storage slices in the RAID. For example, it is shown in FIG. 3 that a storage disk 360 (also referred to as a second storage disk hereinafter) includes a backup storage slice 365 (also referred to as a backup storage slice hereinafter).

It should be appreciated that although FIG. 3 shows, by way of example, a particular number of storage disks and each storage disk includes a particular number of storage slices and the RAID 305 consists of a particular number of storage slices and has a particular RAID type. This is intended to be illustrative only, and is not intended to limit the scope of the present disclosure in any way. In other embodiments, embodiments of the present disclosure may be applicable to any number of storage disks or storage slices, as well as to any type of RAID. For ease of discussion, the storage management method 200 of FIG. 2 will be discussed below in conjunction with FIG. 3.

Referring back to FIG. 2, at 205, the processor 110 of the storage system 100 determines whether the first storage disk 310 becomes offline and remains offline until a first time point. The fact that the first storage disk 310 becomes offline means that all of the storage slices (including the storage slice 315) will become offline. That is, the components of RAID 305, storage slice 315, will become offline and unavailable. In this case, the RAID 305 will not be able to perform normal RAID operations. In addition, it is worth noting that the storage disk may experience a brief glitch in practice, which behaves that the storage disk is temporarily offline but restores quickly within a short period of time. In order to avoid excessive remedial operations due to such glitch, embodiments of the present disclosure set a first time point, which may also be referred to as a storage disk offline overriding time point. In some embodiments, the first time point may be set as several seconds (e.g., 5 seconds) from the first storage disk 310 being offline. In other embodiments, the first time point may be predetermined by a technician in accordance with a particular technical environment and design requirements. Hereinafter, for ease of description, a time point at which the first storage disk 310 becomes offline may be referred to as t0, and the above-described first time point may be referred to as t1.

At 210, if the first storage disk 310 becomes offline and remains offline until the first time point t1, the processor 110 selects the second storage slice 365 in the second storage disk 360 as a backup storage slice for the first storage slice 315 in the first storage disk 310. Hereinafter, for ease of description, the second storage slice 365 may also be referred to as a backup storage slice 365. The selected backup storage slice 365 is used to temporarily store data to be written to the first storage slice 315 in the RAID 305 during the first storage slice 315 is offline. As used herein, the meaning of "temporarily store" means that the backup storage slice 365 cannot completely replace the functions of the first storage slice 315 in the RAID 305, because the backup storage slice 365 does not have the data stored in the first storage slice 315 before the first storage disk 110 is offline. An example of selecting the second storage slice 365 as the backup storage slice of the first storage slice 315 will be described below with reference to FIG. 4.

Figure 4:
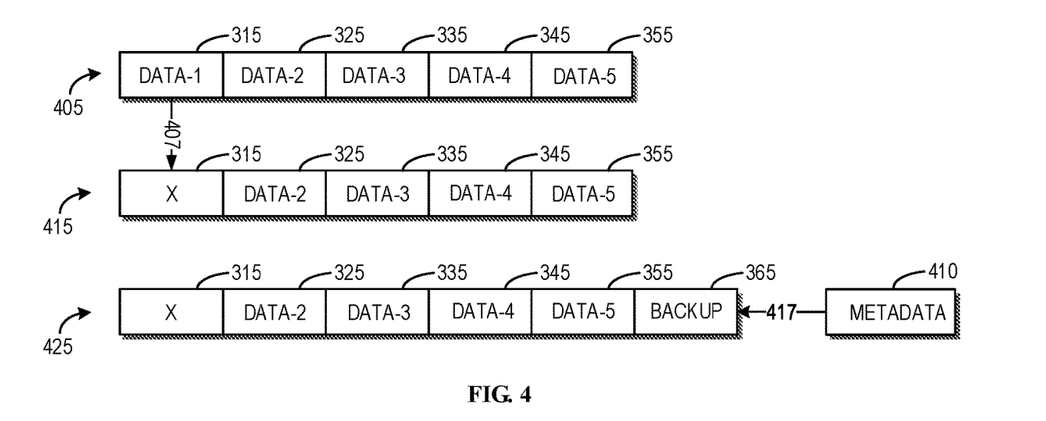
FIG. 4 is a schematic diagram illustrating that selecting a second storage slice as a backup storage slice for a first storage slice after the first storage disk remains offline until a first time point, according to an embodiment of the present disclosure.

FIG. 4 is a schematic diagram illustrating that selecting the second storage slice 365 as the backup storage slice for the first storage slice 315 after the first storage disk 310 remains offline until a first time point t1, according to an embodiment of the present disclosure. In FIG. 4, state 405 represents the state of RAID 305 when the first storage disk 310 is not offline (i.e., before t0), wherein the storage slices 315 to 355 store data-1 to data-5, respectively. State 415 represents the state of RAID 305 when the first storage disk 310 is offline at time t0. As shown at 407, the first storage slice 315 becomes offline at time t0, making data-1 unavailable. State 425 represents that the first storage slice 315 has not restored at the first time point t1, and the processor 110 may select the second storage slice 365 as the backup storage slice for the first storage slice 315.

As shown, in some embodiments, information regarding that the second storage slice 365 acts as the backup storage slice for the first storage slice 315 can be recorded in the metadata 410. That is, the metadata 410 is used to record which storage slice is selected as the backup storage slice for the first storage slice 315. As shown at 417, in the particular example of FIG. 4, the metadata 410 points to the second storage slice 365 acting as a backup storage slice. In some embodiments, the metadata 410 may also be referred to as RAID geometry metadata, which may reuse existing metadata in the current RAID storage system, for further use to record information of the backup storage slice 365. As an example, this information can be recorded in a "copy position" information element of the RAID geometry metadata. By reusing existing metadata, it can be avoided to introduce additional metadata into the storage disk or storage slice. Furthermore, it is noted that the copy operation from the backup storage slice 365 to the first storage slice 315, discussed in detail below, may have lower priority than temporary backup operations and the permanent backup operations and thus, it is safe to reuse the existing RAID geometry metadata. However, it will be appreciated that in other embodiments, the metadata 410 may also be a metadata that is newly set in the storage system 100.

In some embodiments, selection of a backup storage slice may be similar to the selection of a backup storage slice in the RAID system for rebuilding. For example, the processor 110 may select the second storage disk 360 from a plurality of storage slices, such that the plurality of storage slices are evenly used to form a plurality of RAIDs. For example, in a plurality of storage disks of the storage system 100, it is assumed that the storage slices in the second storage disk 360 are currently least likely in the same RAID with the storage slices in the storage disks 320 to 350. In this case, in order to make the respective RAIDs distributed as evenly as possible in all of the storage disks, the processor 110 may determine that a storage slice in the second storage disk 360 is selected as the backup storage slice for the first storage slice 315 of the RAID 305 to facilitate replacing the first storage slice 315 in the RAID 305 after the first storage slice 315 is permanently offline. After the determination of selecting the second storage disk 360, the processor 110 may further select a free storage slice of the second storage disk 360 as the second storage slice 365.

Referring back to FIG. 2, at 215, between the first time point t1 and a second time point (also referred to as t2 hereinafter, for ease of description), the processor 110 writes data to be written to the first storage slice 315 in the RAID 305 into the second storage slice 365. In other words, as the backup storage slice for the first storage slice 315, the second storage slice 365 will be used to temporarily store data to be originally written to the first storage slice 315, thereby avoiding "degraded write" in the conventional scheme. This process will be described below with reference to FIG. 5. In addition, the second time point t2 here can be considered as a time point after which the storage disk 310 will no longer be possible to return online again. Therefore, the second time point t2 can also be considered as a time point at which the use of the backup storage slice 365 is triggered to completely replace the offline first storage slice 310.

Figure 5:
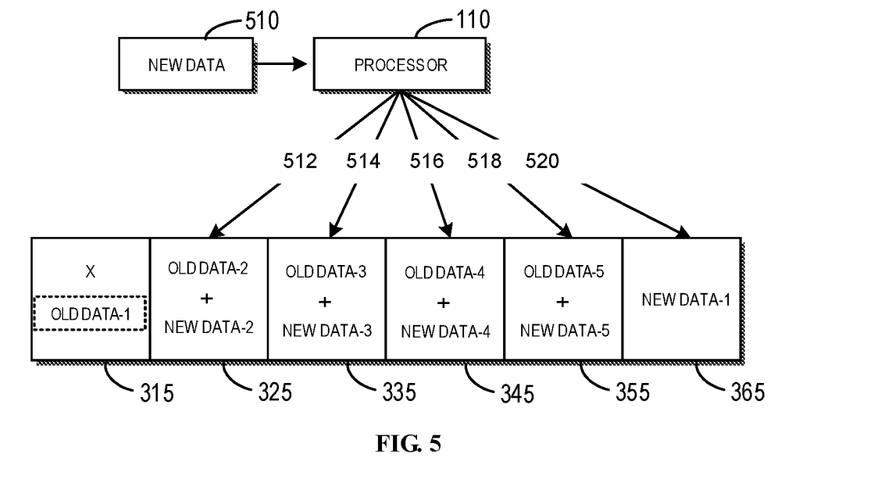
FIG. 5 is a schematic diagram illustrating writing data to be written to a first storage slice into a backup storage slice, in accordance with an embodiment of the present disclosure.

FIG. 5 is a schematic diagram illustrating writing data to be written to the first storage slice 315 into the backup storage slice 365, in accordance with an embodiment of the present disclosure. As shown in FIG. 5, it is assumed that between the first time point t1 and the second time point t2, the processor 110 receives an I/O request to write new data 510 to the RAID 305, due to the presence of the backup storage slice 365, the processor 110 can write, as normal, new data-2 to new data-5 associated with data 510 into the storage slices 325 to 355 in accordance with a RAID algorithm. Hereinafter, for ease of description, data stored in the RAID 305 associated with the data 510 is referred to as new data and data stored in the RAID 305 before the first storage slice 310 being offline is referred to as old data.

Specifically, the processor 110 may write 512 new data-2 to the storage slice 325, write 514 new data-3 to the storage slice 335, write 516 new data-4 to the storage slice 345, and write 518 new data-5 to the storage slice 525. Unlike the case when the first storage slice 315 is online, since the first storage slice 315 cannot be written at this time and there is a backup storage slice 365, the new data-1 to be written to the storage slice 315 will be written 520 to the backup storage slice 365. Therefore, after the new data 510 is written, the old data-2 and the new data-2 are stored in the storage slice 325, the old data-3 and the new data-3 are stored in the storage slice 335, the old data-4 and new data-4 are stored in the storage slice 345, the old data-5 and the new data-5 are stored in the storage slice 355, and the new data-1 is stored in the second storage slice 365. In this way, the new data 510 can be written using a secure RAID algorithm, thereby avoiding the risk of data lost caused by the use of "degraded write" in conventional schemes.

Referring back to FIG. 2, at 220, the processor 110 determines if the first storage disk 310 remains offline until time point t2. As mentioned above, the second time point t2 can be considered as the time point at which the use of the backup storage slice 365 is triggered to completely replace the offline first storage slice 310. In other words, at 220, the processor 110 can determine if the first storage disk 310 needs to be replaced. In some embodiments, based on practical experience regarding the storage system, the second time point t2 can be set as several minutes (e.g., 5 minutes). In other embodiments, the second time point t2 can be predetermined by the technician according to the specific technical environment and design requirements.

At 225, in the case that the first storage disk 310 remaining offline until the second time point t2, the processor 110 replaces the first storage slice 315 in the RAID 305 with the second storage slice 365. This means that the second storage slice 365 will permanently replace the first storage slice 315 as part of the RAID 305. However, as described above, only the new data-1 associated with the new data 510 is stored in the second storage slice 365, and the old data-1 already stored in the first storage slice 315 before the storage slice being offline is not stored. Due to the nature of the redundant storage of the RAID 305, the old data-1 in the first storage slice 315 can be rebuilt from the old data-2 to the old data-5 in the other storage slices 325 to 355. In other words, the processor 110 can rebuild data in the first storage slice 315 into the second storage slice 365 using data of other storage slices in the RAID 305. This rebuilding process will be described below in conjunction with FIG. 6.

Figure 6:
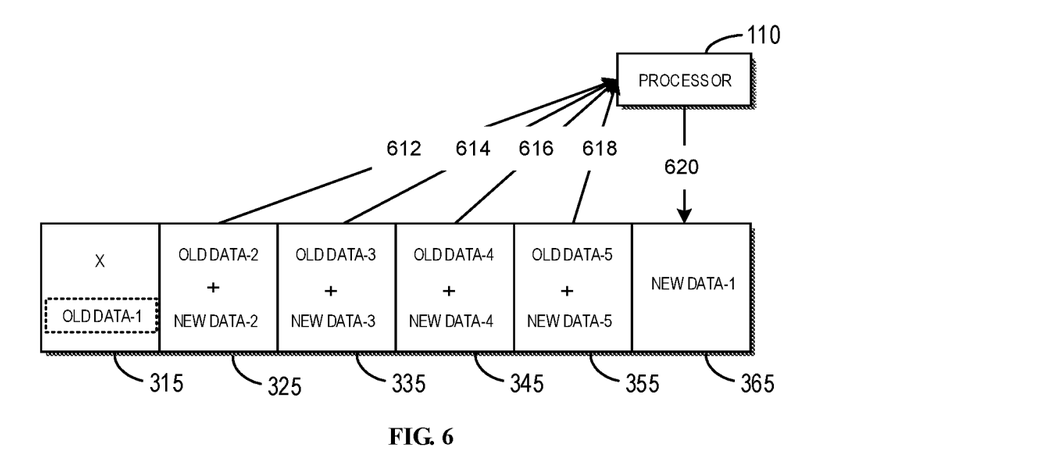
FIG. 6 is a schematic diagram illustrating rebuilding data in a first storage slice to a backup storage slice after the first storage disk remains offline until a second time point, in accordance with an embodiment of the present disclosure.

FIG. 6 is a schematic diagram illustrating rebuilding data in the first storage slice 310 to a backup storage slice 365 after the first storage disk 310 remains offline until a second time point t2, in accordance with an embodiment of the present disclosure. Specifically, as shown in FIG. 6, the processor 110 may copy 612 the old data-2 in the storage slice 325, copy 614 the old data-3 in the storage slice 335, copy 616 the old data-4 in the storage slice 345 and copy 618 the old data-5 in the storage slice 355. Next, the processor 110 may restore the old data-1 stored in the first storage slice 315 from the old data-2 to the old data-5 using a RAID rebuilding algorithm. Then, the processor 110 may store 620 the rebuilt old data-1 into the second storage slice 365. In this manner, the second storage slice 365 will have data previously stored in the first storage slice 315, and thus the first storage slice 315 in the RAID 305 may be completely replaced.

In some embodiments, the rebuilding of the old data-1 can be performed by strips. For example, the processor 110 may determine a stripe in the RAID 305 into which data is written before first storage slice 310 becomes offline. As an example, this information can be recorded in the metadata 410 mentioned above. For the determined stripe, the processor 110 may read data associated with the determined stripe from other storage slices 325 to 355 in the RAID 305. Based on the read data, the processor 110 can calculate data stored in the first storage slice 315 associated with the determined strips. As an example, for a RAID 5 type, the processor 110 may derive the data stored in the first storage slice 315 by calculating an XOR value of the data. The processor 110 can then write the calculated data into second storage slice 365. In the case that a plurality of stripes have been written, the processor 110 may perform the above-described rebuilding process for each of the stripes written. In this way, the old data-1 previously stored in the first storage slice 315 can be rebuilt into the second storage slice 365 more in an effective manner. In some embodiments, after the completion of the above-described rebuilding process, the processor 110 may clear the relevant information in the metadata 410 and re-mark the RAID 305 as normal operation. Moreover, the locking processing for the metadata 410 may be required to be performed in a usual manner.

On the other hand, at 220, if the first storage disk 310 restores online between the first time point t1 and the second time point t2, the processor 110 may copy the data in the second storage slice 365 to the first storage slice 310. As shown in the foregoing, the copy involves only one read operation and one write operation, thereby avoiding the "incremental rebuild" in the conventional scheme that requires four read operations and one write operation, which greatly saves the bandwidths of processors and storage slices and improves performance of the storage system. This copy process will be described below in conjunction with FIG. 7.

Figure 7:
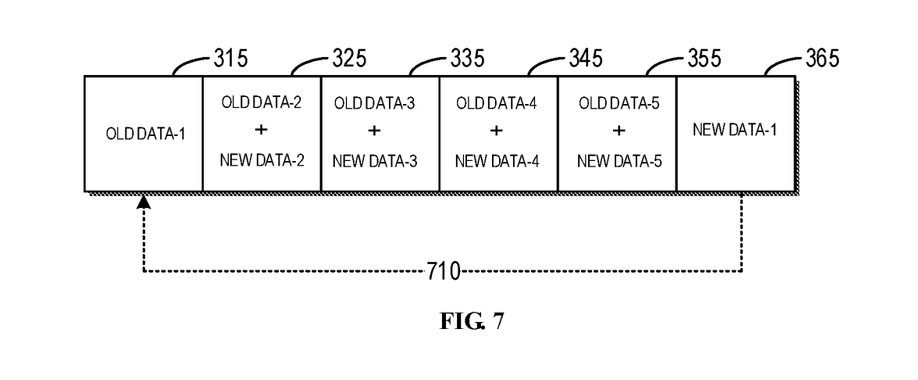
FIG. 7 is a schematic diagram illustrating copying data from a backup storage slice to a first storage slice when a first storage disk restores online according to an embodiment of the present disclosure.

FIG. 7 is a schematic diagram illustrating copying data from a backup storage slice 365 to a first storage slice 315 when a first storage disk 310 restores online, according to an embodiment of the present disclosure. As shown in FIG. 7, at the time point when the first storage disk 310 restores online, the first storage slice 315 has the old data-1 stored before the first storage disk 310 is offline, the storage slice 325 has the old data-2 stored before first storage disk 310 is offline and the new data-2 stored after the first storage disk 310 is offline, the storage slice 335 has the old data-3 stored before the first storage disk 310 is offline and the new data-3 stored after the first storage disk 310 is offline, the storage slice 345 has the old data-4 stored before the first storage disk 310 is offline and the new data-4 stored after the first storage disk 310 is offline, the storage slice 355 has old data-5 stored before the first storage disk 310 is offline and the new data-5 stored after the first storage disk 310 is offline, and the second storage slice 365 has the new data-1 stored after the first storage disk 310 is offline.

It can be seen that, at the time point when the first storage disk 310 restores online, the new data-1 after the first storage disk 310 is offline is absent in the first storage slice 315. Accordingly, in order that the first storage slice 315 continues to form the RAID 305 with the storage slices 325 to 355, the processor 110 may copy 710 the new data-1 in the second storage slice 365 into the first storage slice 315. In this way, the first storage slice 315 restored online has not only the old data-1 but also the new data-1 through only one copy operation, so that it can become a part of the RAID 305 again. As noted above, this effectively avoids the complicated "incremental rebuild" operation performed by conventional RAID storage systems when offline storage slices restore online.

In some embodiments, the copy of the new data-1 can also be performed by strips. For example, the processor 110 may determine a stripe in the RAID 305 into which data is written between a first time point t1 and a second time point t2. The processor 110 may then copy the data in second storage slice 365 associated with the determined stripe into first storage slice 315. In the case that there are a plurality of stripes into which new data are written, the above-described copy operation by stripes may be sequentially performed for a plurality of stripes. In some embodiments, after the completion of the copy operation described above, the processor 110 may clear the relevant information in metadata 410 and re-mark RAID 305 as normal operation. In addition, in order to perform more conveniently the copying of the new data-1, the processor 110 may record a stripe in the RAID 305 into which data is written between the first time point t1 and the second time point t2. For example, it is recorded in the metadata 410.

Further, in some embodiments, during a period from t0 when the first storage disk 310 becomes offline to a first time point t1, the processor 110 may suspend a write operation to the RAID 305. That is, the write I/O operations generated for RAID 305 during this period can be safely written by the normal RAID algorithm after the first time point t1, that is, after the backup storage slice 365 is ready. In this way, the safe write of the data to be written can be achieved at the expense of a short delay (several seconds). This is advantageous because a few seconds of I/O delay does not cause a significant delayed feeling to users in many technical scenarios. On the other hand, since the RAID 305 lacking the first storage slice 315 can still derive the stored data from other storage slices, the processor 110 may not suspend read operation from the RAID 305.

Figure 8:
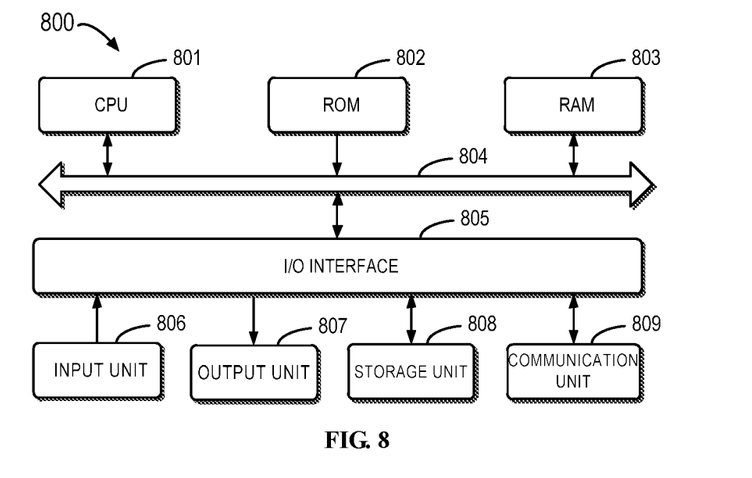
FIG. 8 is a schematic block diagram illustrating a device that can be used to implement embodiments of the present disclosure.

FIG. 8 is a block diagram illustrating a device 800 that can be used to implement embodiments of the present disclosure. As shown in FIG. 8, the device 800 includes a central processing unit (CPU) 801 that may perform various appropriate actions and processing based on computer program instructions stored in a read-only memory (ROM) 802 or computer program instructions loaded from a storage section 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

The following components in the device 800 are connected to the I/O interface 805: an input 806 such as a keyboard, a mouse and the like; an output unit 807 including various kinds of displays and a loudspeaker, etc.; a memory unit 808 including a magnetic disk, an optical disk, and etc.; a communication unit 809 including a network card, a modem, and a wireless communication transceiver, etc. The communication unit 809 allows the device 800 to exchange information/ data with other devices through a computer network such as the Internet and/or various kinds of telecommunications networks.

Various processes and processing described above, e.g., the method 200, may be executed by the processing unit 801. For example, in some embodiments, the method 200 may be implemented as a computer software program that is tangibly embodied on a machine readable medium, e.g., the storage unit 808. In some embodiments, part or all of the computer programs may be loaded and/or mounted onto the device 800 via ROM 802 and/or communication unit 809. When the computer program is loaded to the RAM 803 and executed by the CPU 801, one or more steps of the method 200 as described above may be executed.

As used herein, the term "includes" and its variants are to be read as open-ended terms that mean "includes, but is not limited to." The term "based on" is to be read as "based at least in part on." The term "one example embodiment" and "an example embodiment" are to be read as "at least one example embodiment." The terms "first", "second" and the like may refer to different or identical objects. This article may also include other explicit and implicit definitions.

As used herein, the term "determining" encompasses a wide variety of actions. For example, "determining" can include calculating, computing, processing, deriving, investigating, looking up (e.g., looking up in a table, database, or another data structure), ascertaining, and the like. Further, "determining" can include receiving (e.g., receiving information), accessing (e.g., accessing data in memory), and the like. Further, "determining" may include parsing, selecting, choosing, establishing, and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or a special purpose design hardware. Ordinary skilled in the art may understand that the above method and system may be implemented with computer executable instructions and/or in processor-controlled code, for example, such code is provided on a carrier medium such as an optical or electronic signal bearer.

Further, although operations of the present methods are described in a particular order in the drawings, it does not require or imply that these operations are necessarily performed according to this particular order, or a desired outcome can only be achieved by performing all operations shown. On the contrary, the execution order for the steps as depicted in the flowcharts may be varied. Alternatively, or in addition, some steps may be omitted, a plurality of steps may be merged into one step, and/or a step may be divided into a plurality of steps for execution. In practice, according to the embodiments of the present invention, the features and functions of two or more units described above may be embodied in one unit. In turn, the features and functions of one unit described above may be further embodied in more units.

Although the present disclosure has been described with reference to various embodiments, it should be appreciated that the present disclosure is not limited to the disclosed embodiments. The present disclosure is intended to cover various modifications and equivalent arrangements included in the spirit and scope of the techniques disclosed herein.

We claim:

1. A method of storage management, comprising:
    in response to a first storage disk becoming offline and remaining offline until a first time point, selecting a second storage slice in a second storage disk as a backup storage slice for a first storage slice in the first storage disk, the first storage slice being one of a plurality of storage slices forming a redundant array of independent disks (RAID), the plurality of storage slices being located in different storage disks;
    writing, between the first time point and a second time point, data to be written into the first storage slice in the RAID to the second storage slice, the second time point being later than the first time point; and
    in response to the first storage disk remaining offline until the second time point, replacing the first storage slice in the RAID with the second storage slice.

2. The method of claim 1, wherein replacing the first storage slice with the second storage slice comprises:
    rebuilding data in the first storage slice into the second storage slice, using data in other storage slices in the RAID.

3. The method of claim 2, wherein rebuilding data in the first storage slice into the second storage slice comprises:
    determining a stripe in the RAID into which data is written before the first storage disk becoming offline;
    for the determined stripe,
    reading, from other storage slices in the RAID, data associated with the stripe;
    calculating, based on the read data, data stored in the first storage slice associated with the stripe; and
    writing the calculated data into the second storage slice.

4. The method of claim 1, further comprising:
    in response to the first storage disk restoring online between the first time point and the second time point, copying data in the second storage slice into the first storage slice.

5. The method of claim 4, further comprising:
    recording a stripe in the RAID into which data is written between the first time point and the second time point, to perform the copying.

6. The method of claim 4, wherein copying data in the second storage slice into the first storage slice comprises:
    determining a stripe in the RAID into which data is written between the first time point and the second time point; and
    copying data in the second storage slice associated with the stripe into the first storage slice.

7. The method of claim 1, wherein selecting the second storage slice in the second storage disk as the backup storage slice comprises:
    selecting the second storage disk from a plurality of storage disks, such that the plurality of storage disks are evenly used to form a plurality of RAIDs; and
    selecting a free storage slice in the second storage disk as the second storage slice.

8. The method of claim 1, further comprising:
    suspending a write operation to the RAID during a period from the first storage slice becoming offline to the first time point.

9. An electronic device, comprising:
    at least one processor; and
    at least one memory storing computer program instructions, the at least one memory and the computer program instructions are configured, with the at least one processor, to cause the electronic device to:
    in response to a first storage disk becoming offline and remaining offline until a first time point, selecting a second storage slice in a second storage disk as a backup storage slice for a first storage slice in the first storage disk, the first storage slice being one of a plurality of storage slices forming a redundant array of independent disks (RAID), the plurality of storage slices being located in different storage disks;
    writing, between the first time point and a second time point, data to be written into the first storage slice in the RAID to the second storage slice, the second time point being later than the first time point; and
    in response to the first storage disk remaining offline until the second time point, replacing the first storage slice in the RAID with the second storage slice.

10. The electronic device of claim 9, wherein the at least one memory and the computer program instructions are configured, with the at least one processor, to cause the electronic device to:
  rebuilding data in the first storage slice into the second storage slice, using data in other storage slices in the RAID.

11. The electronic device of claim 10, wherein the at least one memory and the computer program instructions are configured, with the at least one processor, to cause the electronic device to:
  determining a stripe in the RAID into which data is written before the first storage disk becoming offline;
  for the determined stripe,
  reading, from other storage slices in the RAID, data associated with the stripe;
  calculating, based on the read data, data stored in the first storage slice associated with the stripe; and
  writing the calculated data into the second storage slice.

12. The electronic device of claim 9, wherein the at least one memory and the computer program instructions are configured, with the at least one processor, to cause the electronic device to:
  in response to the first storage disk restoring online between the first time point and the second time point, copying data in the second storage slice into the first storage slice.

13. The electronic device of claim 12, wherein the at least one memory and the computer program instructions are configured, with the at least one processor, to cause the electronic device to:
  recording a stripe in the RAID into with data is written between the first time point and the second time point, to perform the copying.

14. The electronic device of claim 12, wherein the at least one memory and the computer program instructions are configured, with the at least one processor, to cause the electronic device to:
  determining a stripe in the RAID into which data is written between the first time point and the second time point; and
  copying data in the second storage slice associated with the stripe into the first storage slice.

15. The electronic device of claim 9, wherein the at least one memory and the computer program instructions are configured, with the at least one processor, to cause the electronic device to:
  selecting the second storage disk from a plurality of storage disks, such that the plurality of storage disks are evenly used to form a plurality of RAIDs; and
  selecting a free storage slice in the second storage disk as the second storage slice.

16. The electronic device of claim 9, wherein the at least one memory and the computer program instructions are configured, with the at least one processor, to cause the electronic device to:
  suspending a write operation to the RAID during a period from the first storage slice becoming offline to the first time point.

17. A computer program product having a non-transitory computer readable medium which stores a set of instructions to perform storage management; the set of instructions, when carried out by computerized circuitry, causing the computerized circuitry to perform a method of:
  in response to a first storage disk becoming offline and remaining offline until a first time point, selecting a second storage slice in a second storage disk as a backup storage slice for a first storage slice in the first storage disk, the first storage slice being one of a plurality of storage slices forming a redundant array of independent disks (RAID), the plurality of storage slices being located in different storage disks;
  writing, between the first time point and a second time point, data to be written into the first storage slice in the RAID to the second storage slice, the second time point being later than the first time point; and
  in response to the first storage disk remaining offline until the second time point, replacing the first storage slice in the RAID with the second storage slice.

* * * * *